(12) United States Patent  (10) Patent No.: US 9,188,820 B1
Evans et al.  (45) Date of Patent: Nov. 17, 2015

(54) AUTONOMOUSLY TUNING PHOTOCONDUCTIVE AND PHOTOVOLTAIC LIGHT VALVES

(75) Inventors: Dean R. Evans, Beavercreek, OH (US); Gary Cook, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 512 days.

(21) Appl. No.: 12/797,687

(22) Filed: Jun. 10, 2010

Related U.S. Application Data

(60) Provisional application No. 61/186,720, filed on Jun. 12, 2009.

(51) Int. Cl.
*G02F 1/135* (2006.01)

(52) U.S. Cl.
CPC .............. *G02F 1/135* (2013.01); *G02F 1/1354* (2013.01)

(58) Field of Classification Search
CPC ..... G02F 1/1351; G02F 1/1354; G02F 1/135; G02F 2001/1357
USPC ........... 349/25–28, 193, 197; 359/487, 500–5
See application file for complete search history.

(56) References Cited

U.S. PATENT DOCUMENTS

| | | | |
|---|---|---|---|
| 4,191,456 A * | 3/1980 | Hong et al. | 359/634 |
| 5,150,236 A * | 9/1992 | Patel | 349/198 |
| 5,172,257 A | 12/1992 | Patel | |
| 5,231,521 A | 7/1993 | Johnson et al. | |
| 5,414,546 A | 5/1995 | Fergason | |
| 5,432,567 A * | 7/1995 | Matsuda | 348/790 |
| 5,619,355 A | 4/1997 | Sharp et al. | |
| 5,805,330 A * | 9/1998 | Byker et al. | 359/265 |
| 5,841,489 A * | 11/1998 | Yoshida et al. | 349/25 |
| 6,061,107 A | 5/2000 | Yang et al. | |
| 6,141,069 A | 10/2000 | Sharp et al. | |
| 6,252,638 B1 | 6/2001 | Johnson et al. | |
| 6,271,899 B1 * | 8/2001 | Lewis et al. | 349/86 |
| 6,522,467 B1 | 2/2003 | Li et al. | |
| 6,545,739 B1 | 4/2003 | Matsumoto et al. | |
| 6,630,982 B2 * | 10/2003 | Li | 349/175 |
| 6,707,518 B1 | 3/2004 | Cowan | |
| 6,813,064 B2 | 11/2004 | John et al. | |
| 7,965,359 B2 * | 6/2011 | Scheffer et al. | 349/117 |
| 2007/0076135 A1 * | 4/2007 | Gomyou et al. | 349/25 |
| 2008/0030635 A1 | 2/2008 | Chien et al. | |
| 2010/0068418 A1 | 3/2010 | Shukla et al. | |

* cited by examiner

*Primary Examiner* — Dung Nguyen

(74) *Attorney, Agent, or Firm* — AFMCLO/JAZ; Charles Figer, Jr.

(57) ABSTRACT

An optical filter or valve comprises autonomously tunable liquid crystal filters in which photoactivated materials such as a photoconductive and photovoltaic substrates or films are used to produce or control application of an electric field to a liquid crystal material to tune the liquid crystal material to the wavelength of the incident light or radiation that is illuminating the filter thereby enabling the filter to automatically and autonomously filter the incident light or radiation.

2 Claims, 2 Drawing Sheets

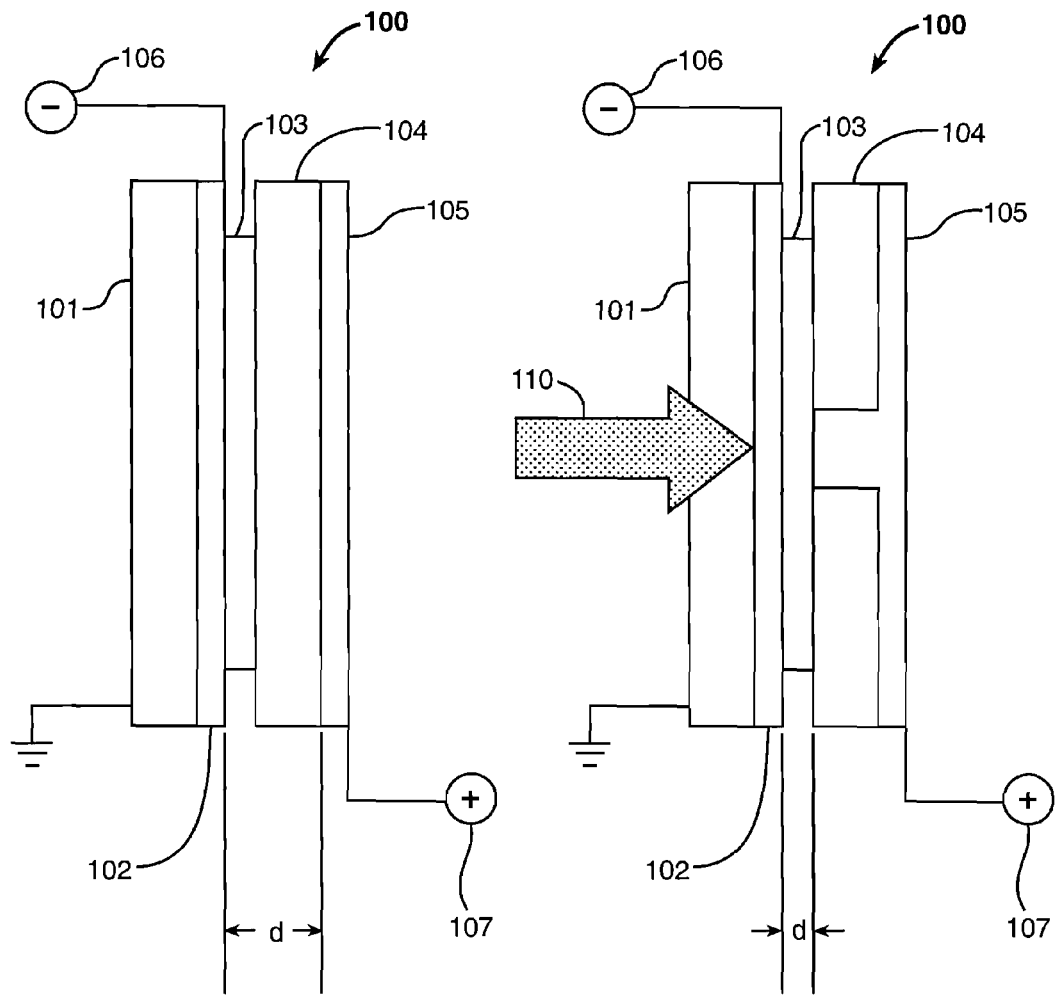
*Fig. 1a*  *Fig. 1b*

AUTONOMOUSLY TUNING PHOTOCONDUCTIVE AND PHOTOVOLTAIC LIGHT VALVES

RELATED APPLICATIONS

This application claims benefit of priority from U.S. Provisional Application Ser. No. 61/186,720, filed Jun. 12, 2009, the entire contents of which are incorporated herein by reference.

RIGHTS OF THE GOVERNMENT

The invention described herein may be manufactured and used by or for the Government of the United States for all governmental purposes without the payment of any royalty.

TECHNICAL FIELD

This disclosure describes the use of photoconductive, photovoltaic, and other photoactivated materials to generate photoinduced electric fields that can be used to control the tuning of liquid crystals. More particularly, it relates to the use of photoactivated organic or inorganic bulk or epitaxial materials to generate or control photoinduced electric fields to control the tuning of cholesteric, nematic, smectic, and other liquid crystals and liquid crystal-like materials, autonomously.

BACKGROUND

Tunable liquid crystal filters that vary the electrical-optical properties of liquid crystal materials have a variety of uses. Currently, tunable liquid crystals use direct current (DC) fields to control the tuning of an active system. Such tunable liquid crystal filter systems are limited by the fact that the optical wavelength must be known a priori and the tuning must be controlled by an electric device such as by cueing to tune the liquid crystal medium to filter the optical wavelength that is anticipated.

SUMMARY OF INVENTION

The self-tuning devices disclosed herein overcome these limitations through the use of photoactivated materials, such as photoconductive and photovoltaic materials, to generate or control an electric field to autonomously tune a liquid crystal material to filter different wavelengths of light. Organic and inorganic photoconductive or photovoltaic substrates or epitaxial films are used to apply a tuning electric field so the incident light or radiation directly controls the field applied to the liquid crystal. This arrangement allows the use of photoconductive, photovoltaic, and other photoactivated materials to generate or control an electric field for autonomously tuning a liquid crystal filter system such that incident light or radiation above a given threshold intensity is automatically blocked with no external monitoring required of the incident light or radiation and no external control required for the filter wavelength.

Photoconductive, photovoltaic, and other photoactivated materials, such as pyroelectric, thermophotovoltaic, and piezoelectric materials, can be made as bulk materials, substrates, or epitaxial films of organic or inorganic materials that autonomously control the electric tuning of the liquid crystal material. Liquid crystal materials include cholesteric, nematic, or smectic liquid crystals having a positive or a negative dielectric anisotropy, and other polymer dispersed and polymer stabilized liquid crystals and materials with liquid crystal-like, birefringent, field dependent absorption/reflection, or scatter properties.

As disclosed herein, an example of an autonomously-tuned optical filter comprises a liquid crystal; and a photoactivated material, wherein the photoactivated material produces or controls an electric field when illuminated by electromagnetic radiation and the electric field tunes the liquid crystal to the wavelength of the electromagnetic radiation, thereby filtering the electromagnetic radiation.

As further disclosed herein, a liquid crystal filter comprises a glass window having an electrically-conductive layer that is positioned on its rear surface and that is connected to a negative source of electrical energy; a liquid crystal material having a front surface and a rear surface wherein the front surface is positioned adjacent to the electrically-conductive layer of the glass window; and a photoconductive window having a front surface positioned adjacent to the rear surface of the liquid crystal material and a rear surface with an electrically-conductive layer that is connected to a positive source of electrical energy, wherein the electrically-conductive layer on the rear surface of the glass window and the electrically-conductive layer on the rear surface of the photoconductive window create or control an electric field across the liquid crystal material.

A method of autonomously tuning a liquid crystal comprises the steps of: illuminating a liquid crystal filter comprising a liquid crystal material and a photoactivated material with electromagnetic radiation whereby the photoactivated material produces or controls an electric field; applying the electric field to the liquid crystal material; and using the electric field to tune the liquid crystal material to the wavelength of the incident electromagnetic radiation so the liquid crystal material autonomously filters the electromagnetic radiation and prevents it from illuminating the photoactivated material.

An electrically-induced absorption or reflection filter comprises: a glass window having an electrically-conductive layer positioned on its rear surface and connected to a negative source of electrical energy; a material with electrically-induced absorption or reflection properties having a front surface and a rear surface wherein the front surface is positioned adjacent to the electrically-conductive layer of the glass window; and a photoconductive window having a front surface positioned adjacent to the rear surface of the electrically-induced absorption or reflection material and a rear surface with an electrically-conductive layer that is connected to a positive source of electrical energy, wherein the electrically-conductive layer on the rear surface of the glass window and the electrically-conductive layer on the rear surface of the photoconductive window create or control an electric field across the field dependent absorption or reflection material.

An electrically-induced scatter filter comprises: a glass window having an electrically-conductive layer that is positioned on its rear surface and that is connected to a negative source of electrical energy; a material with electrically-induced scatter properties having a front surface and a rear surface wherein the front surface is positioned adjacent to the electrically-conductive layer of the glass window; and a photoconductive window having a front surface positioned adjacent to the rear surface of the electrically-induced scatter material and a rear surface with an electrically-conductive layer that is connected to a positive source of electrical energy, wherein the electrically-conductive layer on the rear surface of the glass window and the electrically-conductive layer on the rear surface of the photoconductive window create or control an electric field across the field dependent absorption or reflection material.

BRIEF DESCRIPTION OF THE DRAWINGS

FIG. 1a shows a photoconductive device.
FIG. 1b shows the photoconductive device of FIG. 1a being illuminated.

DETAILED DESCRIPTION

Figures 2A, 2B:
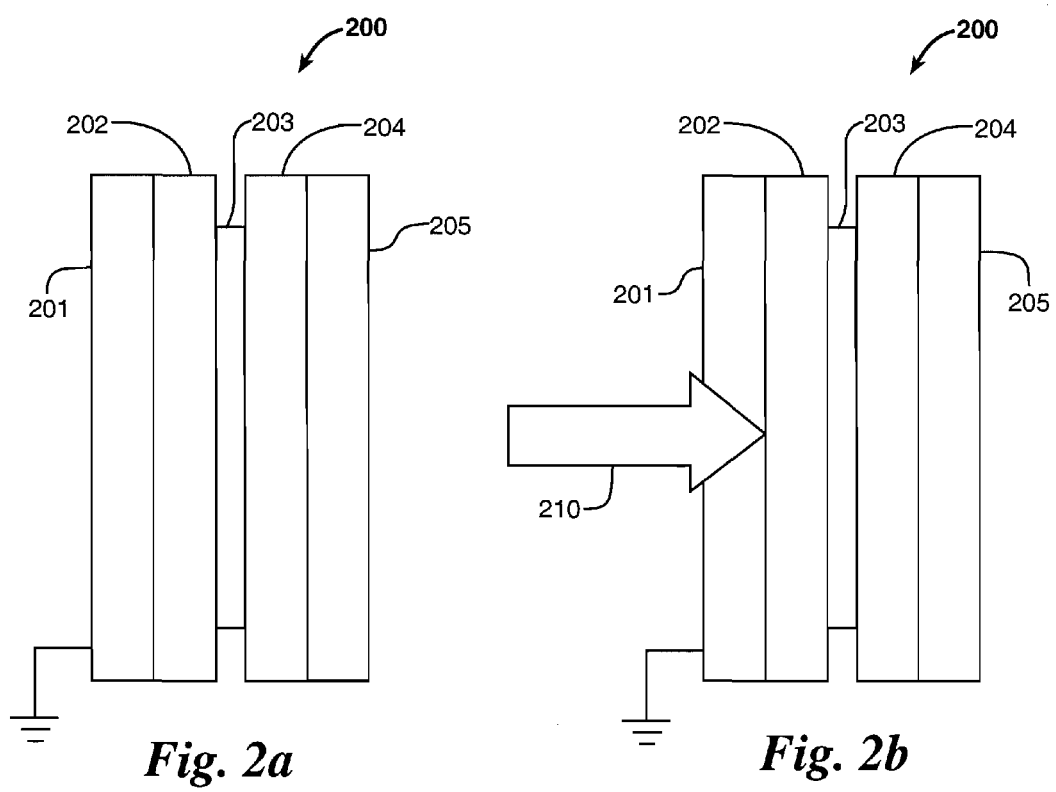
FIG. 2a shows a photovoltaic device.
FIG. 2b shows the photovoltaic device of FIG. 2a being illuminated.

Photoinduced or photoactivated materials suitable for the autonomously tuned optical filters disclosed herein include photoconductive, photovoltaic, pyroelectric, thermophotovoltaic, and piezoelectric materials in substrates or epitaxial layers. A photoconductive device 100 may comprise a glass window 101 having an electrically-conductive coating 102 on its rear surface, a liquid crystal material 103, and a photoconductive window 104 having an electrically-conductive coating 105 on its rear surface, as shown in FIG. 1a. The electrically-conductive coatings 102, 105 comprise an indium-tin oxide, indium oxide, or other optically-transparent material that provides electrically-conductive surfaces on the glass window 101 and photoconductive window 104 with good optical transparency. The glass window 101 is electrically grounded. The electrically-conductive coating 102 on the glass window 101 is connected to a negative source of electrical energy 106 to serve as a negative electrode. The electrically-conductive coating 105 on the photoconductive window 104 is connected to a positive source of electrical energy 107 to function as a positive electrode. The photoconductive window 104 comprises a photoconductive material such as gallium, germanium, selenium, doped silicon, metal oxides, sulfides, or other material whose electrical conductivity increases with absorption of electromagnetic radiation such as visible light (coherent or incoherent, narrowband or broadband, e.g., sunlight), ultraviolet light, infrared light, laser light, or gamma or x-ray radiation. The glass window 101 may comprise polarized glass, which may induce circular polarization for use with cholesteric liquid crystals, or may induce linear polarization for nematic liquid crystal devices. Alternatively, the device shown in FIG. 1a may be duplicated in series such that each sub-device acts independently on one polarization state; this expedient eliminates the need to incorporate circular polarization elements when the device is used with cholesteric liquid crystals. The liquid crystal 103 comprises an electrically-tunable cholesteric, nematic, or smectic liquid crystal having a positive or a negative dielectric anisotropy, an electrically tunable polymer stabilized cholesteric, nematic, or smectic liquid crystal having a positive or a negative dielectric anisotropy, or an electrically tunable polymer dispersed cholesteric, nematic, or smectic liquid crystal having a positive or a negative dielectric anisotropy. Depending on the media, the device may function as a spectral (e.g., reflective cholesteric filter) or spatial (e.g., nematic field dependent optical scattering) filter.

When electrical energy is applied to the conductive coatings 102, 105, an electric field is produced or modified between the conductive coatings 102, 105 and across the liquid crystal material 103. The electric field that is produced between the conductive coatings 102, 105 is defined as $E=V/d$, where V=Voltage and d=the thickness of nonconductive material between the conductive coatings 102, 105. When no light or electromagnetic radiation illuminates the photoconductive device 100, the thickness "d" is the distance between the electrically-conductive coating 102 on the glass window 101 and the electrically-conductive coating 105 on the photoconductive window 104. In this example, the thickness "d" of the nonconductive material is the combined thicknesses of the liquid crystal material 103 and the photoconductive window 104.

When no light or electromagnetic radiation illuminates the photoconductive device 100, the electric field E is small due to the relatively large thickness "d" of the nonconductive materials (in this case, the liquid crystal material 103 and the photoconductive window 104) between the electrically-conductive coatings 102, 105. When the photoconductive device 100 is illuminated by light or other electromagnetic radiation 110 that is absorbable by the photoconductive window 104, the electrical conductivity of the photoconductive window 104 increases volumetrically and extends the electrically-conductive region from the rear conductive coating 105 through the photoconductive window 104. As a result, the nonconductive distance "d" between the electrically-conductive coatings 102, 105 is just the thickness of the liquid crystal layer 103, as shown in FIG. 1b, and the electric field between the front and rear conductive surfaces 102, 105 becomes strong enough to permit the liquid crystal material 103 to tune. The liquid crystal 103 only tunes to the wavelength of the light 110 because at that point the liquid crystal layer 103 acts as a filter to block the light or radiation 110 from reaching the photoconductive window 104. As a result, the photoconductive window 104 becomes non-conductive, increasing the thickness "d" of the nonconductive material between the conductive coatings 102, 105 to that shown in FIG. 1a. The increased thickness "d" reduces the electric field E by a factor of approximately 1000× thereby taking the liquid crystal material 103 out of tune. This repeatable phenomenon effectively creates a feedback loop through the photoconductive device 100. The electric field that tunes the liquid crystal material 103 in this example is photoinduced in the sense that the incident light or electromagnetic radiation 110 increases the electrical conductivity of the photoconductive material 104 and thereby controls application of an external electric field that is applied to the liquid crystal 103 by the conductive coating electrodes 102, 105. As the conductivity of the photoconductive material 104 increases, the strength of the electric field applied to the liquid crystal 103 increases thereby tuning the liquid crystal 103 so that it filters the incident electromagnetic radiation or light 110 (while the applied voltage remains constant).

As shown in FIG. 2a, a photovoltaic device 200 comprises a front glass window 201, an electrically-conductive coating 202, a liquid crystal material 203, such as an electrically-tunable cholesteric, nematic, or smectic liquid crystal or other liquid crystal material described in the previous example, a photovoltaic window 204, and a rear glass window 205. The front and rear glass windows 201, 205 may be polarized as described in the previous example. The liquid crystal 203 is sandwiched between the electrically-conductive coating 202 and the photovoltaic windows 204. The front glass window 201 is electrically grounded. The electrically-conductive coating 202 comprises indium-tin oxide, indium oxide, or other optically-transparent material that provides an electrically-conductive surface on the front glass window 201 with good optical transparency. The photovoltaic window 204 comprises, for example, a monocrystalline silicon, polycrystalline silicon, microcrystalline silicon, cadmium telluride, copper indium selenide/sulfide, lithium niobate, lithium niobate doped with metallic impurities, or other material that converts solar and electromagnetic radiation such as visible light, laser light, coherent or incoherent light, ultraviolet light, infrared light, or gamma or x-ray radiation into electricity. Other suitable photoactivated material may be used, as well.

When the photovoltaic device 200 is illuminated by coherent or incoherent light or other electromagnetic radiation 210, as shown in FIG. 2b, the photovoltaic window 204 generates an electric field with the electrically-conductive coating 202 across the liquid crystal 203. The electric field tunes the liquid crystal 203 to filter the wavelength of the electromagnetic radiation or light 210 at which point the liquid crystal 203 blocks the radiation or light 210 from reaching the photovoltaic window 204. When the light or electromagnetic radiation 210 is blocked by the tuned liquid crystal material 203, the photovoltaic window 204 no longer produces a photoinduced electric field and the liquid crystal 203 goes out of tune. This again creates a feedback loop. The photovoltaic device 200 may be configured so the photovoltaic window 204 is optical to the rear of the device 200, if desired.

As disclosed herein, a wide variety of photoconductive, photovoltaic, and other photoactivated materials may be used with cholesteric, nematic, and smectic liquid crystals of positive and negative anisotropy, and other polymer stabilized and polymer dispersed liquid crystal materials to form liquid crystal filters that are autonomously tunable. These self-tuning filters or light valves can be adapted to function with existing state of the art tunable filter systems and can be designed to tune automatically and autonomously to light of different wavelengths. The use of optically-controlled, field-generating substrates and epitaxial materials enables these devices to autonomously and automatically tune liquid crystals and materials with liquid crystal-like birefringent, field dependent absorption/reflection or scatter properties through their self-sensing and self-initiating tuning capability that applies and adjusts electric fields to tune the liquid crystal to filter the light or other radiation that is illuminating the device. The active region of the device is locally defined by the light or radiation source where it illuminates the photoconductive, photovoltaic, or other photoactivated material (i.e., exposed pixels) in the device, as opposed to the entire liquid crystal cell, so the process can be made to operate in the region of a laser beam or other focused or unfocused light or radiation source. In addition, no external AC or DC fields are required except for devices that use photoconductive materials. In the case of devices with photovoltaic materials and other photo-activated materials that generate photoinduced fields, the material generates and applies the tuning electric field to the liquid crystal. Other suitable photoactivated materials include pyroelectric, thermophotovoltaic, piezoelectric materials. The materials may be used as substrates or applied as epitaxial films.

The foregoing disclosure has been presented for purposes of illustration and description and is not intended to be exhaustive or to limit the disclosure to the laser devices, systems, methods, and forms disclosed herein. Persons skilled in the art will realize and appreciate that many modifications and variations are possible in light of the above teaching. For example, although the self-tuning windows are illustrated with photoconductive and photovoltaic materials, any other photoactivated or field producing material may be used to tune the liquid crystal material. The disclosed self-tuning windows may be used to tune cholesteric, nematic, smectic, and other liquid crystal materials, or other materials with liquid crystal-like, birefringent, or field dependent absorption/reflection properties to act as filters or light valves. The disclosed methods and associated devices and their variations were described to best explain the principles of the invention and its practical applications to thereby enable other persons skilled in the art to make and use the invention in its various forms and with its various modifications as are suited to the particular uses contemplated. The scope of the invention is to be defined by the following claims.

What is claimed is:

1. A self-tuning light valve, comprising a layered structure, including, from front to rear, contiguous layers of:
    (a) a transparent window;
    (b) a first optically transparent electrically conductive coating, wherein the first optically transparent electrically conductive coating is connected to a source of electrical energy of a first polarity;
    (c) a liquid crystal material;
    (d) a photoconductive window; and,
    (e) a second optically transparent electrically conductive coating, wherein the second optically transparent conductive coating is connected to a source of electrical energy of a second polarity opposite to the first polarity.

2. A self-tuning light valve, comprising a layered structure, including, from front to rear, contiguous layers of:
    (a) a transparent window;
    (b) an optically transparent electrically conductive coating;
    (c) a liquid crystal material; and,
    (d) a photovoltaic window.

* * * * *